(12) United States Patent
David

(10) Patent No.: US 7,123,814 B2
(45) Date of Patent: Oct. 17, 2006

(54) AUDIO/VIDEO PRODUCTION METHOD

(75) Inventor: Morgan William Amos David, Farnham (GB)

(73) Assignee: Sony United Kingdom Limited, Weybridge (GB)

( * ) Notice: Subject to any disclaimer, the term of this patent is extended or adjusted under 35 U.S.C. 154(b) by 1172 days.

(21) Appl. No.: 09/825,916

(22) Filed: Apr. 4, 2001

(65) Prior Publication Data

US 2002/0159752 A1 Oct. 31, 2002

(30) Foreign Application Priority Data

Apr. 5, 2000 (GB) ................................ 0008433.5

(51) Int. Cl.
*H04N 5/93* (2006.01)
(52) U.S. Cl. .......................................... 386/52; 386/95
(58) Field of Classification Search .................. 386/46, 386/94, 95, 83, 52, 125; 725/60
See application file for complete search history.

(56) References Cited

U.S. PATENT DOCUMENTS

| | | | |
|---|---|---|---|
| 5,041,921 A | 8/1991 | Scheffler | |
| 5,438,355 A | 8/1995 | Palmer | |
| 5,526,133 A | 6/1996 | Paff | |
| 5,592,511 A | 1/1997 | Schoen et al. | |

2005/0144641 A1* 6/2005 Lewis .......................... 725/60

FOREIGN PATENT DOCUMENTS

GB 2 325 544 11/1998

OTHER PUBLICATIONS

WPI Abstract Accession No. 2000-171961 & CN 1237762 Sony Corporation, Aug. 12, 1999.
WPI Abstract Accession No. 1996-297605 & JP 080129859 Sony Corporation May 21, 1996.

* cited by examiner

*Primary Examiner*—Huy Nguyen
(74) *Attorney, Agent, or Firm*—Oblon, Spivak, McClelland, Maier & Neustadt, P.C.

(57) ABSTRACT

A method of facilitating identification of audio and/or video productions, comprising the steps of maintaining a register of unique program identification codes which identify corresponding audio/video productions, assigning a new unique program identification code on request from a producer of a new audio/video production, and up-dating the register with the new unique program identification code in association with the new audio/video production. The unique identification code may be a UPID or the like. The method includes acquiring items of audio/video material for use in forming the new audio/video production, generating during the step of acquiring the audio/video material items a unique identifying code for each of the audio/video material items, and populating the register with the unique identifying codes in association with the unique program identification code. The unique identifying code may be a UMID or the like.

12 Claims, 7 Drawing Sheets

| Application | |
|---|---|
| Syntax |  |
| Dictionary | DATA / VALUE<br>HORSE NAME / SHERGAR<br>COLOUR / BROWN |
| Data Coding | Data.txt<br>Horse Name="Shergar" |
| Transfer / Storage | Destination Zip<br>Sender Zip |  |
| |  |  |

METADATA STORED CENTRALLY (ONCE) WITH REFERENCE ON CONTENT

AUDIO/VIDEO PRODUCTION METHOD

FIELD OF THE INVENTION

The present invention relates to methods for facilitating the generation of audio and/or video productions.

The present invention also relates to asset management systems for audio and/or video productions.

BACKGROUND OF THE INVENTION

The subject matter and content of audio and video productions varies greatly. In addition to this variety there is, correspondingly, a considerable quantity of such audio and video productions. Audio productions include, for example, radio broadcasts, both live and pre-recorded, musical and audio recordings, whereas video productions include, for example, films, television programs and video recordings. As will be appreciated typically video productions also include an accompanying sound track or commentary, so that an audio production is inherently included as part of the video production.

The term audio and/or video will be used herein to refer to any from of audio information or signals, video information or signals, or a combination of video and audio information or signals. The term audio/video will be used for short to refer to audio and/or video.

Audio and video productions are generated by acquiring audio and/or video material items and combining these material items in accordance with a selected sequence. Often the items of audio/video material are acquired from earlier productions, which are re-used to form part or parts of subsequent audio/video productions.

SUMMARY OF THE INVENTION

Various different aspects and features of the present invention are defined in the appended claims.

According to a first aspect there is provided a method of facilitating identification of audio and/or video productions, said method comprising maintaining a register of unique program identification codes in association with corresponding audio/video productions, assigning a new unique program identification code on request from a producer of a new audio/video production, and up-dating the register with said new unique program identification code in association with said new audio/video production.

The present inventions provides a facility for uniquely identifying audio/video productions throughout a life cycle of such productions. The advantages of the inventive method can be best appreciated by way of an example applications, although it will be appreciated that this is but one example of many applications. Audio/video productions are expensive to generate. As such, in order to recover the cost of generating the audio/video productions it is necessary for the owner of the rights to the earlier audio/video production to charge royalty payments for the use of the earlier production. If several different items of content are re-used from earlier audio/video productions, then the task of identifying and tracking the content items in order for example to recover royalty payments represents a complex task. In particular if there are different owners of the rights in the re-used audio/video productions then generating a list of these rights and a payment for these rights, which may be under different terms for different owners represents a task of increasing complexity. The present invention therefore provides an advantage in maintaining an association of the audio/video production with a code which uniquely identifies this production. As such if the code is uniquely embedded in the production, a register maintaining the code in association with the audio/video production provides a facility for identifying and tracking the source of part or parts of the productions which are re-used for subsequent productions.

Although the unique program identification code could be any data value identifying the audio/video production within an organisation, in preferred embodiments, the unique identification code may be a UPID or the like. The UPID is a standard which provides potentially a globally unique identification code.

Advantageously, the method may include the steps of acquiring items of audio/video material for use in forming the new audio/video production, generating during the step of acquiring the audio/video material items a unique identifying code for each of the audio/video material items, and populating the register with the unique identifying codes in association with the unique program identification code. By generating a unique identification codes for each audio/video material item from which the audio/video production is comprised, not only can the production be uniquely identified but also the parts which make up the productions.

Although the unique identification code could be any data value identifying the audio/video material items within an organisation, in preferred embodiments, the unique identification code may be a UMID or the like. The UMID is a standard which provides potentially a globally unique identification code for audio/video material items.

According to an aspect of the present invention there is provided an asset management system for facilitating identification of audio and/or video productions, the asset management system comprising a database for storing data representative of a register of unique program identification codes which identify corresponding audio/video productions, an asset management processor coupled to the database which is arranged in operation to assign a new unique program identification code on request from a producer of a new audio/video production, and to up-date the register with the new unique program identification code in association with the new audio/video production.

Various further aspects and features of the present invention are defined in the appended claims.

BRIEF DESCRIPTION OF THE DRAWINGS

Embodiments of the present invention will now be described by way of example with reference to the accompanying drawings wherein.

DESCRIPTION OF PREFERRED EMBODIMENTS

Integrated System

Figure 1:
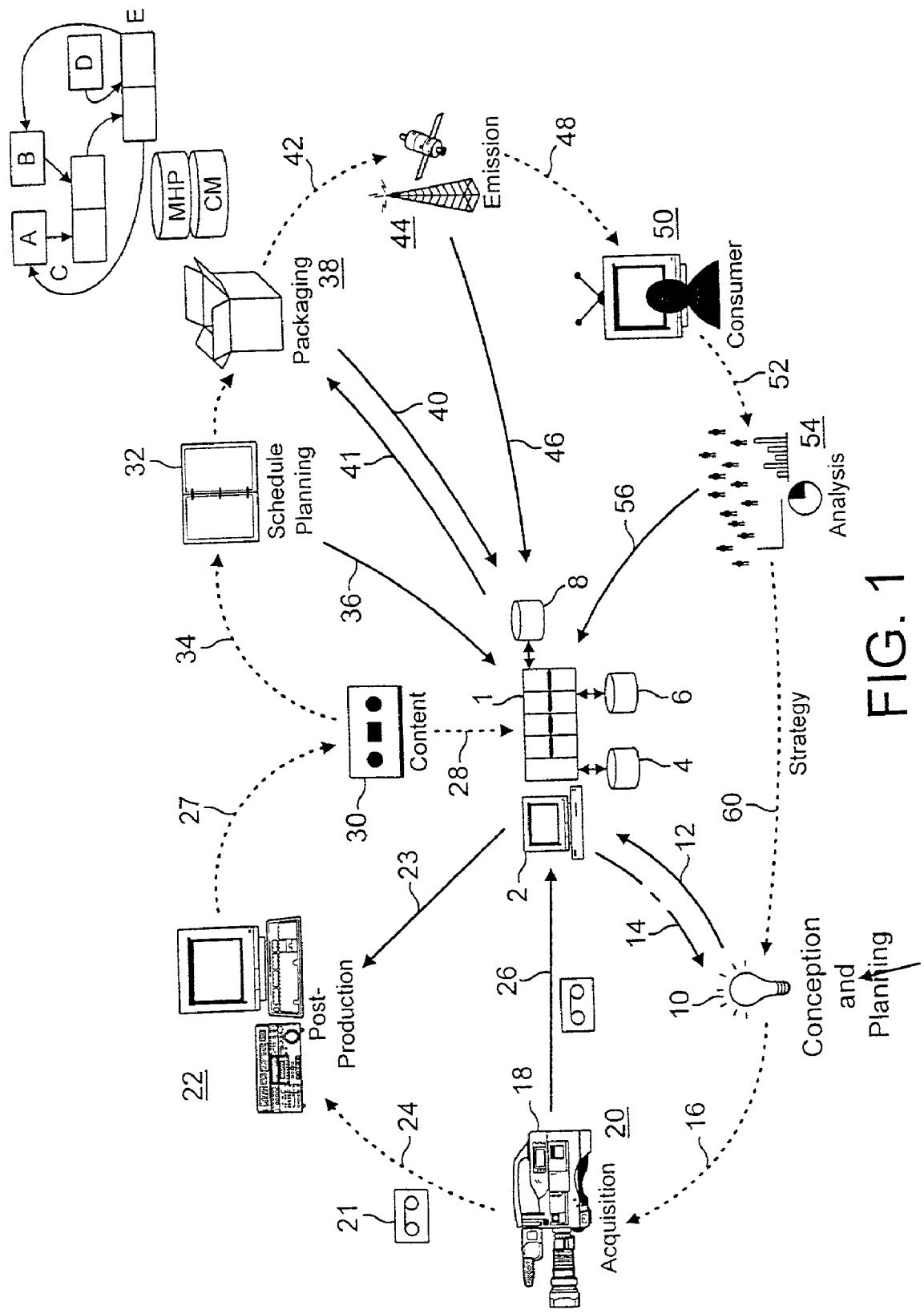
FIG. 1 is schematic representation of an integrated system for planning, acquisition, production and emission of audio/video programs.

An integrated system for uniquely identifying and tracking audio/video material items, in order to facilitate planning, acquisition and generation of audio/video productions will now be described with reference to FIG. 1. In general, the integrated system according to FIG. 1 provides a facility for identifying items of audio/video material within an audio/video production as well as the audio/video production itself, from conception, to acquisition, to generation, to viewing and analysis. This integrated system can be used to facilitate copyright licensing and billing for use of particular audio/video material items. As will be explained, the system for identifying uniquely the audio/video material items and the audio/video productions provides a facility for planning subsequent audio/video productions in accordance with previously produced audio/video productions and consumer analysis information representing the relative audience for these audio/video productions. The planning information, which was used to generate the audio/video production, and the consumer analysis information indicating a relative success of the audio/video production is fed back to enrich a knowledge base for generating subsequent productions.

FIG. 1 provides an illustrative representation of the integrated system for the planning, acquisition, production, emission and analysis of audio/video productions. In FIG. 1 an asset management system 1 is shown to comprise a data processor 2 which is arranged in operative association with a first program database 4, a rights database 6, and a consumer analysis database 8 the purpose and function of which will be explained shortly. The asset management system 1 is arranged to maintain a database in which Unique Metadata Identifier (UMID) which uniquely identifies items of audio/video material are associated with a Unique Program Identifier (UPID) which uniquely identifies a program. A program is an audio/video production which is comprised of a combination of items audio/video material items, some of which may be generated during an acquisition stage of the system. As a result each UPID will be associated with at least one UMID representing the audio/video material from which the program corresponding to the UPID is comprised.

The generation of the UPID in associate with the UMID will now be explained. At a first planning and concept stage 10 a format or sequence of audio/video material is identified. This is typically identified as a combination of scenes and within each scene a number of shots which represent action events within the scene. However each shot may require a number of takes. A take is an item of content from which audio/video material is generated which may result, for example, from a camera taking real time action which is recorded as a continuous event. The planning stage might also identify product placements and sponsorship items which must be included within the audio/video program. As represented by an arrow 12 it is at this stage which a UPID is assigned to the audio/video program. In preferred embodiments the asset management system is a central registry and the assignment of UPID is effected by sale, providing the unique UPID in exchange for money. The producers of the audio/video program at the planning and concept stage 10, may also interrogate the asset management system for viewing figures produced when similar audio/video programs have been previously shown. This is also held in the asset management system 1 which is populated, as will be described shortly, with viewing figures captured when an audio/video program is emitted. Hence the viewing figures which form part of a collection of strategic information is received at the planning and concept stage 10 as represented by the broken line 14.

The term emitted will be used to described the distribution of the audio/video program on any medium, which includes terrestrial and satellite broadcast, as will as sale on video tape and digital versatile disc.

As indicated by the clockwise broken line arrow 16 the next stage in the system is the acquisition of the audio/video material from which the audio/video program is to generated. Therefore based on the planning information produced at the concept stage 10, the audio/video generation apparatus such as a camera 18 at the acquisition stage 20 is used by a camera crew to generate the audio/video material in accordance with the planning information. This might be for example at a sound stage or a similar environment such as an outside broadcast. The planning information however is not discarded at this stage but retained and passed with the audio/video material to a production stage 22 which is the next stage via the anti-clockwise arrow 24. However the planning information is also stored in the asset management system 1 for use in generating future audio/video programmes of a similar nature. This is represented by the arrow 26. At the acquisition stage 20 UMIDs are generated in association with the audio/video material items generated. Thus, for each take produced by the camera 18 a UMID is generated in association with that audio/video material. The UMIDs are then also transferred via the connecting arrow 26 to the asset management system 1 and stored in association with the UPID previously set up at the planning and conception stage 10. Additionally, UMID can be associated with a task or short storyboard position which itself is associated with the UPID. The audio/video material may be for example recorded onto a tape 21 which may include the UMIDs associated with the items of audio/video material. The tape is therefore representative of the audio/video material so far generated and from which the program is to be reproduced. The tape is therefore passed via arrow 24 to an editing stage which is represented generally as a post production stage 22.

During editing, items of audio/video material are combined from a greater set of audio/video material produced at the acquisition stage 20. This facilitated by additional information introduced at the acquisition stage 20, at which a plurality of takes are typically produced for each shot whereas in fact only one take is typically required for each shot to fulfil requirements of the program. Therefore, from a plurality of takes at least one is selected. The preferred shot may be indicated by a so called 'Good Shot Marker' (GSM) which then appears as metadata. The GSM may be added to the medium on which the audio/video material is recorded, such as the video tape 10, or may be stored separately with associated time codes indicating the in and out points of the take. The GSM is then combined with the metadata and UMID associated with the audio/video material item and stored as a data structure within the asset management system. This data structure forming the asset management of the data base will be described in a separate section. However the GSM is used during the post production stage to enable an efficient identification of the takes which are to be used to form the shots of the scenes. Furthermore, at the post production stage 22, other audio/video material may be combined with the material generated at the acquisition stage 20. The combined material is then assigned a further UMID, which is also stored in the asset management data base.

The editing performed at the post production stage 22 may make use of the planning information, received from the asset management system 1 as indicated by an arrow 23. This information may be used for example to ensure that product placements within the audio/video material items and sponsorship material is maintained in the edited version of the program.

As a result of the editing process, the audio/video material from which the program has been formed is now a reduced sub-set from that produced at the acquisition stage 20, but may also include audio/video material from archives or animation or graphics. As such the UMIDs which identify each item of audio/video material will have changed from the set of UMIDs identifying the audio/video material from that received from the acquisition stage 20. As a result an updated set of UMIDs associated with the UPID is communicated to the asset management system as represented by the arrow 28 which represents the audio/video material within the audio/video production represented on a storage medium 30. Furthermore, at the post production stage 22 the audio/video material associated with these UMIDs may be stored in the data base. The content of the audio/video program is therefore that produced from the editing at the post production stage 22. From the audio/video program 30, the next stage is a scheduling stage 32 which is introduced, in order to schedule the emission of the audio/video program which is therefore received via the connecting arrow 34. At the schedule planning stage 32 a time at which the audio/video program is, for example, to be broadcast is identified and a corresponding timeslot assigned which corresponds to the length of the time available. At this stage the UPID is mapped to a program identifier with the date and time of scheduling for broadcast of the program. As a result this information is also fed back to the asset management system 1 (represented as an arrow 36) so that the program identifier and date and time of scheduling can be associated with the UPID.

After the planning and scheduling stage 32 the video program is then packaged at a stage 38. At the packaging stage 38 character merchandising deals are identified in association with the characters which may appear in the audio/video program. Furthermore the advertisements and trailers are associated with the audio/video program. However with assistance of the UMIDs and the planning information held in the asset management system 1, the character merchandising deals may be identified in correspondence with the content of the audio/video material as described by the UMIDs. Furthermore in accordance with the planning information which identifies the product placements and sponsorship, advertisements can be appropriately selected to accompany the audio/video program. Again this is all achieved by interrogating the asset management system 1 which is represented by a further arrow 40, 41. Finally as represented by the clockwise arrow 42, the packaged program is sent for emission at a broadcast stage 44 on an appropriate format. The appropriate format may be for example digital video broadcasting in which case the program identifier may be added. The program identifier may be for example the transport identifier which is used to identify DVB packets forming a program, within a multiplexed stream of packets for other programs. However at the emission stage 44, the final version of the program to be broadcast is monitored so as to establish exactly what has been emitted. To this end, a further modification of the UMIDs associated with the UPID may be made to the effect that the content of the audio/video program in the form in which it is to be emitted is identified by logging the UMIDs associated with the content of the emitted program. However this may require the combination of UMIDs which describe the content of the audio/video program which has been adapted for emission. This is because the version of the program formed for emission may contain the content items of the un-adapted program and content items added to a particular version such as advertising material. As such, a hierarchical formation of UMIDs is required in which the UMIDs which describe the content of the un-adapted program and the UMIDs which describe the content of the additional material are combined to form a new UMID. The new UMIDs include a reference to the combined content items as a reference to the UMIDs which described theses content items in a recursive fashion. This is illustrated in FIG. 1, by boxes A and B, which represent UMIDs which described different content items of the un-adapted program. A new UMID for the program is illustrated as box C, which refers back to the UMIDs A and B. When the program is adapted for emission, further material is added. The UMID associated with this further material is represented by a UMID D. When the program is adapted for emission and the original content and the further material is formed, a new UMID E is formed to represent the content of the adapted version. The new UMID E is arranged to refer back to UMIDs A and B in a hierarchical fashion.

There may be different versions of the same program issued on different media. For example the form of the program which is broadcast may differ to a version of the program as recorded on to a digital versatile disc. For this reason a set of UMID's for each version may differ as a result of the differing content. Each version of the program may therefore be assigned a different UPID identifying that version of the program. Therefore at the emission stage 44 an update of the asset management system 1 is effected as represented by the further arrow 46 so that the final UPID to UMID association is recorded for each emitted version of the program.

A clockwise broken arrow 48 represents the emission of the audio/video program to consumers. At a consumption stage 50 consumers are watching/listening to the audio/video production. At this stage however marketing information is gathered by monitoring the number of consumers which are listening and/or watching the audio/video program, when the program is broadcast, or monitoring the sales of the distributed program through pay-per-view, or sales of, for example, digital versatile discs. For the example in which the program is broadcast, the proportion of consumers viewing/listening the program might be gathered for example via a set top box. Typically such set top boxes are provided with a telephone line which is communicated to a marketing centre which monitors which programs are being watched by a selected sample of consumers from which marketing information and analysis is formed. This marketing information and analysis is acquired as represented by a clockwise broken arrow 52 to produce a relative proportion of a possible population viewing the audio/video program with respect to time to the effect that individual items of audio/video material associated with UMIDs may be evaluated as to the relative audience detected at the time of broadcast. The marketing information provided at an analysis stage 54 is then also fed to the asset management system 1 and associated with the corresponding UPID for the program. This information is stored in the consumer analysis data base 8. At the analysis stage 54 the program identifier is associated with the UPID and forwarded to the asset management system 1 via the connecting arrow 56.

The transport program identifier in combination with the time of emission is mapped to UPID within the database 8. The database 8, may therefore include a table matching the transport program identifiers 54 with the time of emission. With this information the corresponding UPID is added to the table, providing a match between UPID and program ID/time of emission. As such the time of day of consumer analysis at stage 50 is logged with respect to the time of emission at stage 44, providing a match between the emission process 48 and the analysis process 54. In further embodiments of the invention, the UPIDs and/or UMIDs may be converged. Furthermore, the UMID may be used to form a watermark within the audio/video program.

The integrated system as represented in FIG. 1 is provided with a particular advantage in that the viewing figures generated at the analysis stage 54 are fed back and associated with the UPID and with individual UMIDs associated with the audio/video material within the program. As such at a future planning and conception stage 10 for subsequent audio/video programs, the producers of the new program may interrogate the asset management system 1 and receive not only the production plans for the earlier program but the viewing figures and analysis of consumer rating for the program and parts of the program. Each new audio/video program serves to further enrich the asset management system 1 from which future productions of programs may benefit. This benefit is therefore represented in FIG. 1 by a connecting arrow 60. In effect, therefore the integrated system shown in FIG. 1 provides a means for identifying all audio/video material associated with each audio/video program produced.

Two example applications of this identification and tracking of audio/video material will now be explained. As will be appreciated the copyright of the audio/video program will be owned by the producers of that program. However the copyright of individual items of audio/video material may not belong to the producers. Through the integrated system of FIG. 1, each item of audio/video material is associated with a UMID. As such the asset management system 1 is provided with the database 6 in which the copyright owner of the audio/video material is stored with its corresponding UMID. As a result after the program has been packaged at stage 38 and emitted at stage 44, a list of licence requirements for audio/video material not owned by the production company can be generated and appropriate royalties calculated. The royalties may be calculated from a business management software application forming part of the asset management system 1. Furthermore because the integrated system provides a measure of the audience for each individual item of audio/video material, the licensing royalties may be established as a function of the relative audience for those parts of audio/video material.

A further example application of the audio/video material identification and tracking facility provided by the integrated system shown in FIG. 1 is for billing. This is because, as explained above, different media may be used to represent the same program and as such the program may differ to some extent between different media. As a result at the emission stage 44 the augmented content of each of the versions of the program on different media is analysed. This might be for example to identify product placement and sponsorship items which may be different between the different versions of the program identified. The UMIDs associated with this audio/video material can then be fed to a database. Such a database may be the database 8 of the asset management system 1. Therefore from the different items of audio/video material produced for the different versions of the program, a bill may be automatically generated in accordance with sponsorship and produce placement deals. This may be similarly effected using a business management application program forming part of the asset management system 1.

It will be appreciated from the foregoing description that one of the advantages of the integrated system shown in FIG. 1 is that audio/video productions can utilise planning and concept information of previous audio/video productions. Furthermore audio/video productions can also benefit from marketing information providing a relative measure of consumer demand for previous audio/video productions and parts of the productions. As subsequent audio/video productions generate further planning information, and market analysis information, which is fed back and incorporated into the asset management system 1, the asset management system 1 is further enriched to the benefit of further productions. The term emitted will be used to described the distribution of the audio/video program on any medium, which includes terrestrial and satellite broadcast, as will as sale on video tape and digital versatile disc.

Metadata Overview.

For the purposes of this discussion, "material" is video and audio information for example a video programme recorded on a video tape. Metadata is the data and information that is created and used during the lifecycle of material production and distribution. It includes for example:—Media content identification Copyright Programme planning Scripts (lighting, anchor-man, camera . . . )

Edit decisions

Contracts (Cast, Commissioning, Sales, Transmission rights)

Systems Layers (Compression format/rate, EPG . . . )

Other data and information relevant to material

Manual annotations or automatic annotations of material

UMIDs and other identifiers. UMIDs are described in the section 'UMIDs'. They are unique material idntifiers which are used in embodiments of the present invention to bind the materail to the metadata.

Media includes tape, disc and other media on which information can be recorded.

Figure 2:
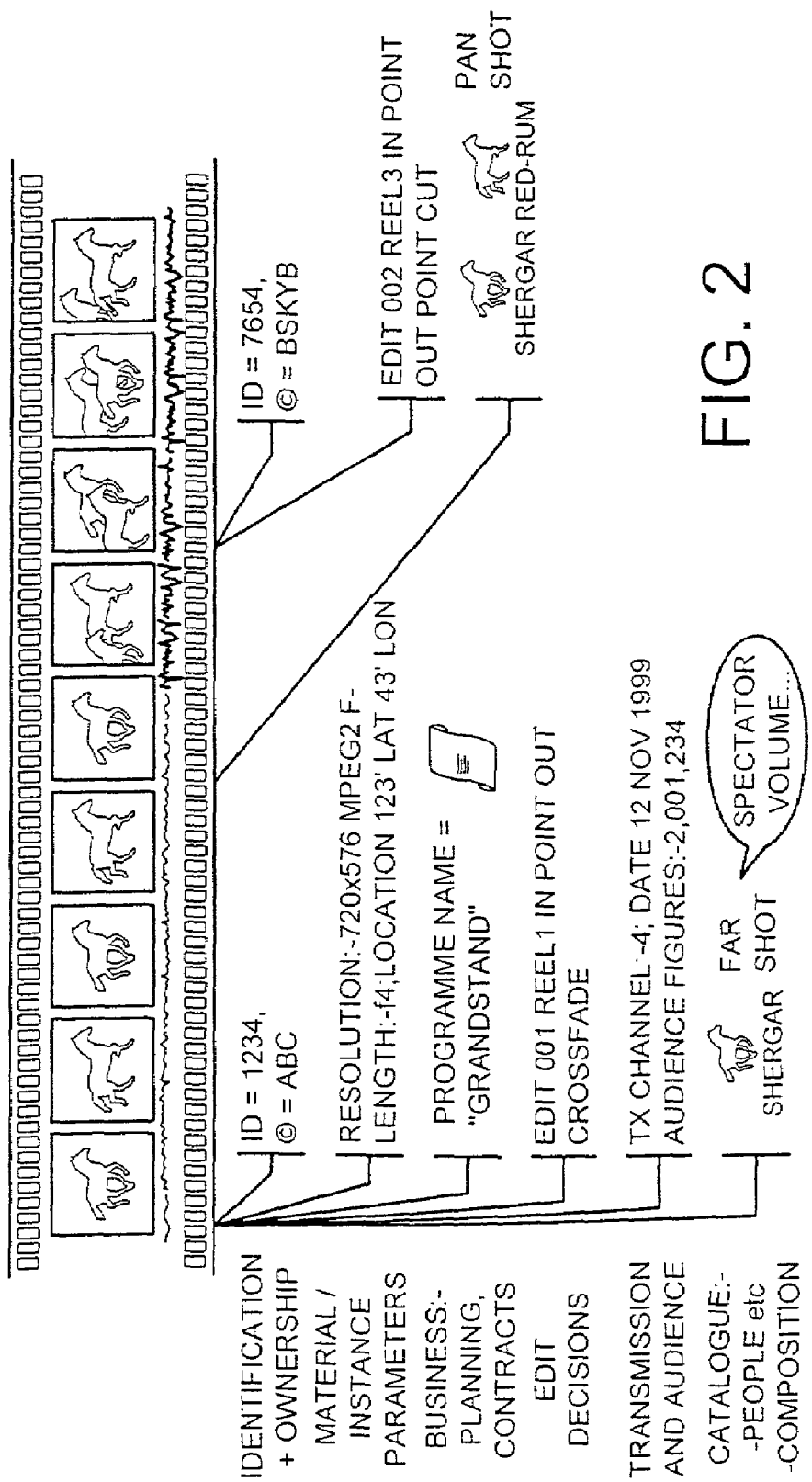
FIG. 2 illustrates a small proportion of the metadata which may be produced in the creation and transmission of a programme such as horse racing.

Referring to FIG. 2, FIG. 2 illustrates a small proportion of the metadata which may be produced in the creation and transmission of a programme such as horse racing.

The metadata includes data which may be produced during planning of the programme and before the making of the programme such as Identification and Ownership data and Business, Planning and Contracts data.

It also includes data produced during and after the making of the programme such as Material/Instance parameters, Edit Decisions, and technical data such as resolution and focal length, and location. By way of explanation: a material number identifies an original clip; and an Instance number identifies a version or copy of the original clip. Thus instance 0 is the original clip and instance 1 is the first copy.

The metadata also includes data created after the transmission of the programme such as the Transmission and Audience data and Catalogue data.

FIG. 2 illustrates only some examples of metadata. Other examples include information required for digital video broadcast transmission such as compression type and rate. Yet other examples of metadata are given in the section Camera Metadata.

Metadata Uses

Table 1 identifies an extremely simplified view of some metadata. It lists where the data is created within the production chain, and where it is used.

| Production Stage \ Metadata | Pre-Production Plan and Commission | Production Editorial Planning and Scripting | Production Acquisition | Production Content Creation | Sale | Sale and Transmission Packaging | Sale and Transmission Delivery | Sale and Transmission Payments | Archival Catalogue/ Research |
|---|---|---|---|---|---|---|---|---|---|
| Viewing Statistics | Used (Planning) | | | | | | Create | | |
| Scripts | | Create | Used (Locations) | Used (Edits) | | Used (Enhanced TV) | | | Used (Search) |
| Editorial Brief | | Create | Used (plan) | Used (edits) | | | | | |
| Tape ID | | | Create | Create | | Used (ID) | Used (ID) | | |
| Material ID (UMID) | | | Create | Create/Used (ID) | | Used (ID) | Used (ID) | Used (ID) | Used (ID) |
| Material Name | | | Create/Used (Handle) | Create/Used (Handle) | Completed Material (Product) | Used (Handle) | Used (Handle) | Used (Handle) | Used (Handle) |
| Shooting Location | | | Create | Used (Navigation) | | | | | Used (Search) |
| Shooting Time | | | Create | Used (Navigation) | | | | | Used (Search) |
| Good Shot Markers | | | Create | Used (Navigation) | | | | | |
| Annotation of Content | | | Create | Used (Edits) | | | | | Used (Search) |
| Composition | | | | Create | | Used (DVB-SI and ETV) | | | |
| Video Copyright | | | Create | Create and Used | | Used (Encryption) | Used (Clearance) | Used (Royalty) | Used (Search) |
| People/Roles | | Create | Used (Assignment) | Used (Assignment) | | Used (Make EPG / ETV) | | Used (Royalty) | Used (Search) |
| Delivery - Systems Layer: Encode B/W | | | | | | Create | Used | | |
| Delivery - Systems Layer: Pan/Scan | | | | Create (Possibly) | | Create (Possibly) | Used | | |
| Delivery - Systems Layer: EPG | | | | | | Create | Used | | |
| TX Schedule | Create | | | | | Create or Modify | Used (automation) | | Used (Search) |
| Contacts: Production | Create | | | | | | | Used (Royalty) | |
| Contacts: Person/Stars | | Create | | | | | | Used (Royalty) | |
| Contacts: Sale/Transmission | | | | | Create | | Used (Check) | Used (Value) | |
| Consumer Subscriptions | Used (Planning) | | | | | | | Used (PPV) | |
| Catalogue Annotation | | | | | | | | | Create/Used (Search) |

Table 1. Illustration of Metadata Creation and Use

Once metadata is created, stored and accessible, it may be used many times in many stages of subsequent handling of the material. Many of the items listed above may be written once and read many times at different stages in the production and distribution chain. For example a Good Shot Marker (GSM) records or identifies good shots in material, as it is acquired. By preserving the GSM markers with the material, they are available to be read many times within an editing session. Additionally should the material be re-purposed, or recovered from archive, the GSM's are still available to the next user.

The script may be preserved as metadata. For example the script (Row 2) is created in the scripting stage, and used in both the creation and the content creation stages of production and in the distribution stage. The script contains both data content (the words to be spoken) and metadata (descriptions of the scene). The script also contains descriptions of the characters who speak the words and also descriptions of scenes Thus when preserved as metadata, the script can be used both in the production of enhanced formats by supplying extra user information such as the spoken lines as well as providing navigation data to enable searching in an archival system.

Metadata Structure

Figure 3:
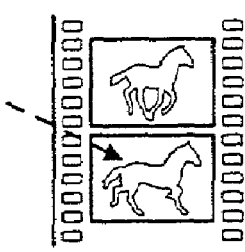
FIG. 3 is a simplified schematic illustration of a layered metadata structure.
Figure 3:
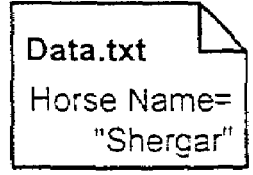
Figure 3:
Figure 3:
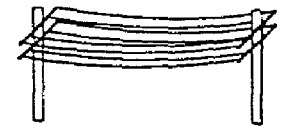
Figure 4A:
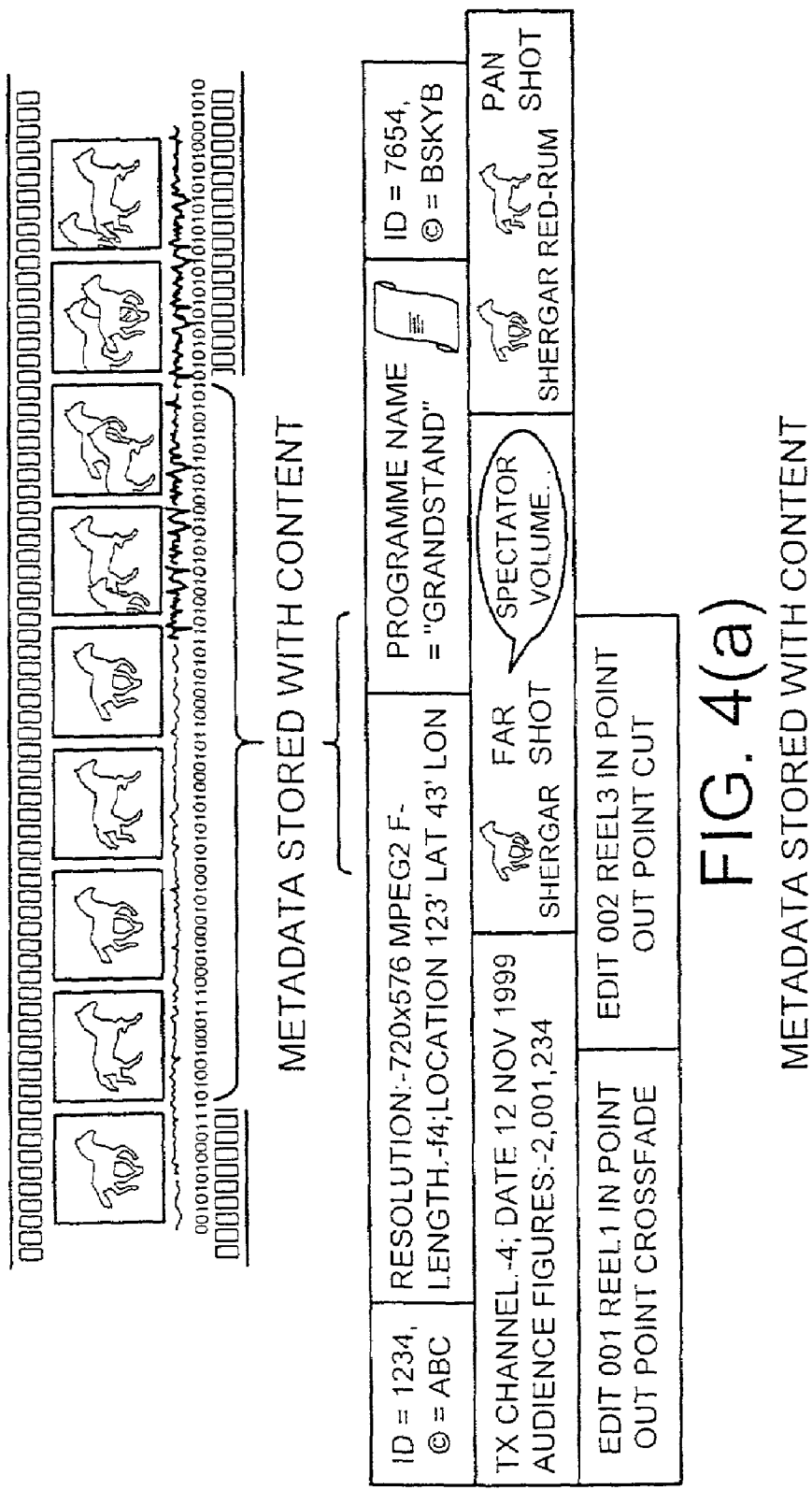
FIGS. 4a and 4b illustrates two ways of storing metadata within a system which produces and/or distributes audio and/or video data.
Figure 4B:
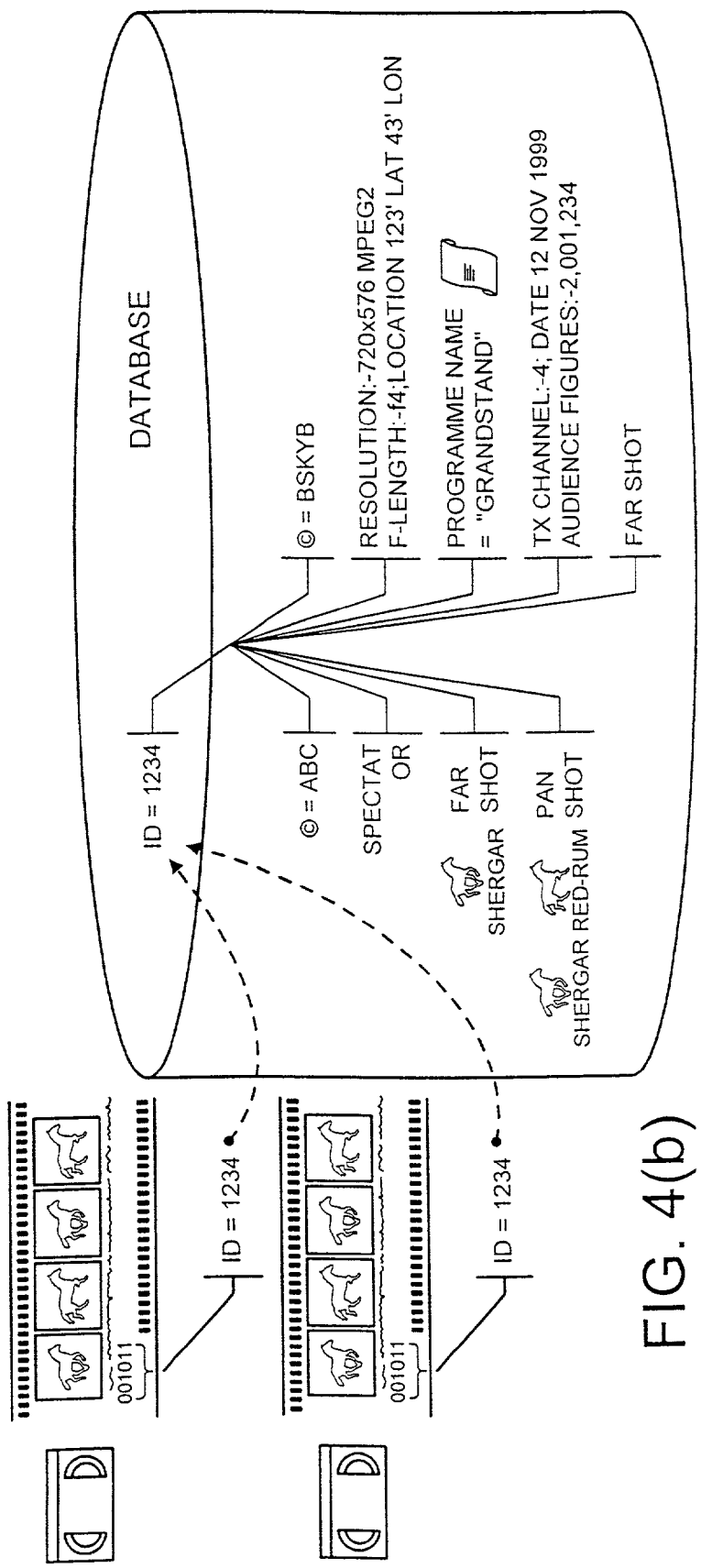

FIG. 3 is a simplified schematic illustration of a layered metadata structure. The structure has the following layers:-

Application: which is a tool within a production stage where A/V and/or Data is to be used and manipulated.

Syntax: which represents how a standard dictionary items used to describe the image or sound will be represented in a data syntax (or grammar).

Dictionary: defines an agreed set of terms to describe the data (i.e. a dictionary). For example "Dog Name" instead of "Pet Name" or "Animal Name".

Data Coding: this layer adds the specific methods of data encapsulation. It may include multiple coding layers applied in a recursive manner to complete a 'wrapper' or 'file' format.

Transfer/Storage: this layer comprises the two parallel paths of streaming (file/stream transfer) and storage which allow the transfer of the material and metadata to, and/or storage of the material and metadata in, for example networked processors and storage media.

Physical: this layer represents how the data is electrically or magnetically stored or transmitted.

Some international standards or proposed standards which may be applied to the layers are set out in the following Table 2:-

TABLE 2

| Standard | SMPTE Diction-aries | SMPTE KLV | MPEG-7 | AAF (MXF/AXF) | XML | SDTI-CP |
|---|---|---|---|---|---|---|
| Application | | | | | | X |
| Syntax | | X | X | X | | |
| Dictionary | X | | X | X | | |
| Data Coding | | X | X | X | X | X |
| Physical | | X | | X | X | X |

Embodiments of the present invention use metadata within an audio and video production and distribution system to augment the operation of the system. Metadata is stored in the system. FIG. 3 illustrates two ways of storing metadata within a system: both represent the metadata created in the example of FIG. 3. In FIG. 3(*a*), all of the metadata is stored within a content server or a content tape. How to store metadata on tape is discussed later. In FIG. 3(*b*), only a reference identifier is stored with the content, and this reference matches a single copy of data held within a database.

Metadata is dynamic. For example consider the life of a piece of material:

Metadata is created at the planning stage

Metadata is created at the production stage

Editing existing material creates new composite material which is identified and described by metadata Each sale of material updates the ownership and/or contract metadata Each transmission, adds the new transmission date, and audience viewing figures Archive catalogue updates indexes, or corrects indexes.

The dynamic nature of metadata has consequences for the two options illustrated in FIG. 3. Where the metadata is stored with the content (FIG. 3*a*) whenever the metadata is changed, all copies of the material are found, and the metadata of each copy is updated. However with a single copy of metadata held within a database (FIG. 3*b*), as the metadata is changed, the copies of content are unaffected. The UMIDs which are the unique material ID that bind the metadata to content never change.

Separating the metadata from the content by storing it in a database has a number of advantages over embedding metadata with the content. For example, it allows an increase in data storage size and the ability to search data using high-speed random access techniques.

Although the use of a database may be optimum to preserve data integrity, it may not be optimum for all practical installations. Where content is exchanged across physical sites, or where secure network connections are neither available nor economic embedding the data with the content may be necessary.

Storage of Metadata on Tape

Embodiments of the present invention allow the storage of metadata on tape for existing installations, using a format that is compatible with current VTR equipment and IT infrastructure. Embodiments of the invention also allow the storage of metadata on emerging formats eg MXF for tape or optical disk. MXF is briefly described below.

Storage of Metadata on Video Tape

Figure 5:
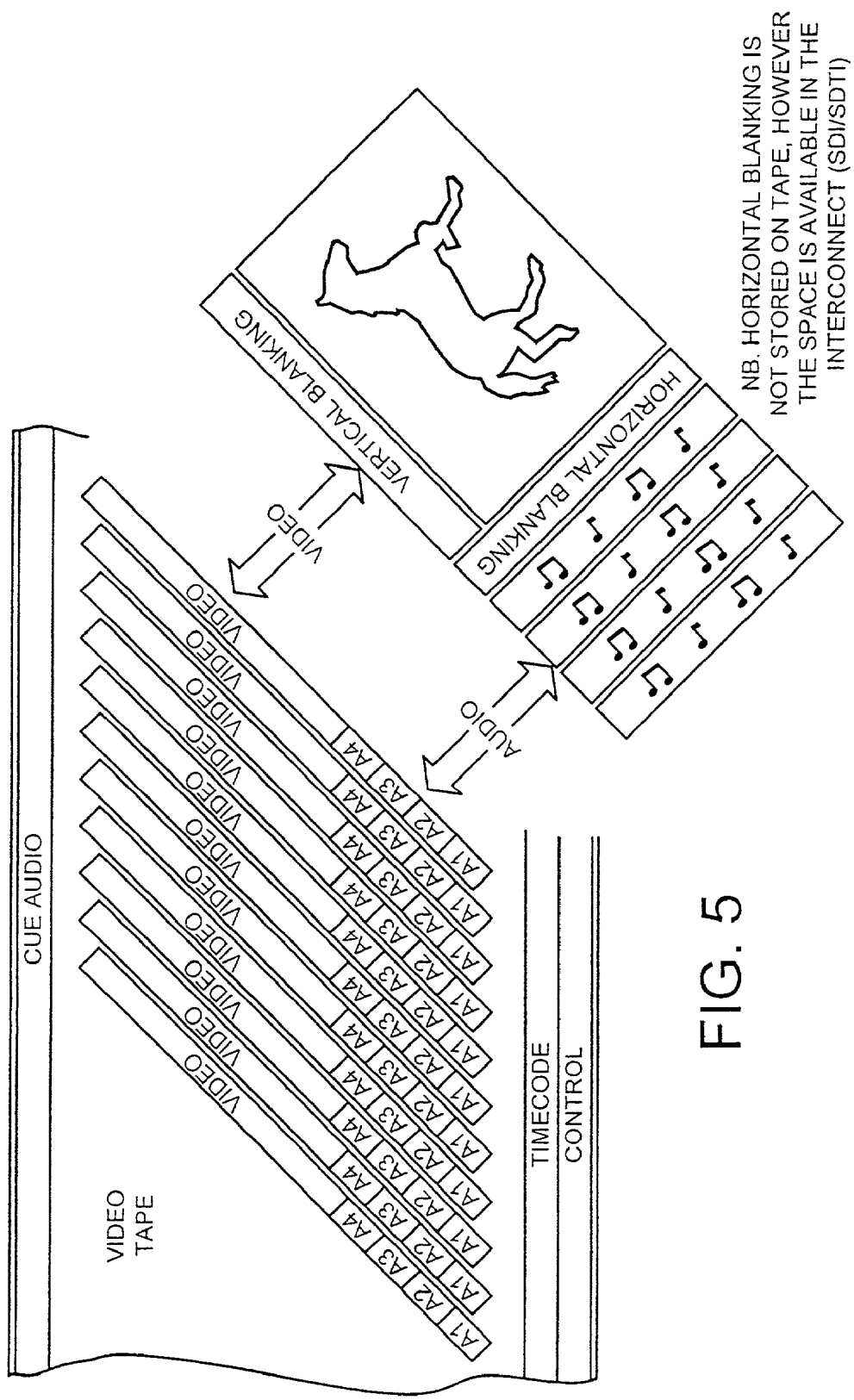
FIG. 5 is a basic illustration of where audio and video may be stored on video tape.

FIG. 5 is a basic illustration of where audio and video are stored on video tape (analogue and digital). In this simplified illustration there a number of elements: a video track, four audio tracks ($A_1$ to $A_4$), a time code track, a control track and linear audio cue track.

To add metadata to existing video tape formats, the data is included in one or more of these existing tracks. There are a number of "spaces" available (shown shaded in FIG. 5), that can store data, and which have only a small impact on the storage of audio and video on the tape. These are listed below in Table 3.

| Area | Description | Impact on A/V | Editablity | Digital Betacam | D1 | SX, MX, Servers | HD-CAM2 |
|---|---|---|---|---|---|---|---|
| | | | | | | Approx Capacity | |
| Vertical blanking Interval (VBI) | The non-visible video lines stored above the real image | None or small | Insert with Video | 4000 approx Bytes/Sec (teletext like) | 200 Kbytes/Sec | 72 K Bytes/Sec | 12 Kbytes/Sec |
| An audio Track | Use one (or more) audio tracks to store data | Loss of an audio track | Insert without effecting A/V | per track 96 KBytes per Sec | per track 96 KBytes per Sec | per track 96 KBytes per Sec | per track 96 KBytes per Sec |
| Time-code user bits | Use the user-bits area of the time-code | None | Insert without effecting A/V | 200 Bytes/Sec | 200 Bytes/Sec | 200 Bytes/Sec | 200 Bytes/Sec |
| Other | | None | ? | N/a | N/a | 500–2000 Byte/Sec | N/a |
| Horizontal Blanking | Suitable for networking Only | N/a | N/a | N/a | N/a | N/a | N/a |

Most preferably UMIDs are stored on the tape. UMIDs can be accommodated on existing tape. For example the user bits can store UMIDs to 0.2 second resolution. However the UMIDs may be stored elsewhere and other identifiers stored on the tape as described in the section 'Tape IDs'.

Storage of Metadata on Emerging Tape/Optical Disk File Formats

Newly proposed removable-media (tape and optical disk) and fixed media (hard-disk) products are able to interchange computer files. In the standardisation process of the formats for such interchangeable files, the needs of Audio/Video content and metadata are addressed.

The MXF (media exchange format)[See Ref 2] is designed for exchange of final material, play-out and long-term storage. The format provides four essential parts to the file:

The identification of media and encoding format
Complex metadata description
Streaming A/V content, with streaming synchronised metadata if necessary
Indexing (allowing cue to time-codes).

Benefits

The systematic use of metadata within the content creation industry according to embodiments of the present invention provides many benefits including:

Increase productivity, allowing a higher proportion of resource on the creation activity
Decrease material transaction costs
Increase the value of content
Increase the quality of programmes.

UMID Description

Figure 6:
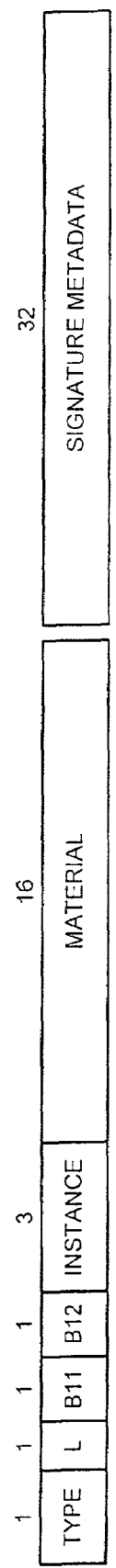
FIG. 6 is a schematic block diagram illustrating the structure of a data reduced UMID.
Figure 7:
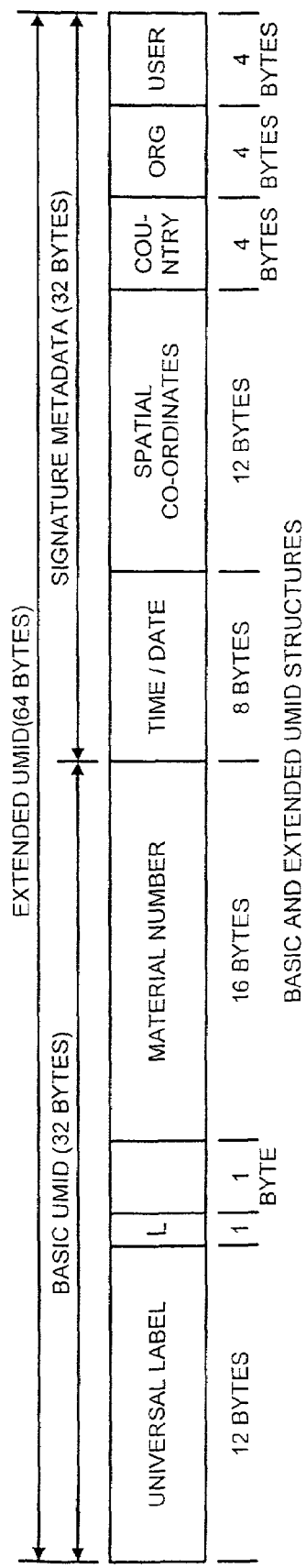
FIG. 7 is a schematic block diagram illustrating the structure of an extended UMID.

A UMID is described in SMPTE Journal March 2000 which provides details of the UMID standard. Referring to FIGS. 6 and 7, a basic and an extended UMID are shown. It comprises a first set of 32 bytes of basic UMID and a second set of 32 bytes of signature metadata.

The first set of 32 bytes is the basic UMID. The components are:

A 12-byte Universal Label to identify this as a SMPTE UMID. It defines the type of material which the UMID identifies and also defines the methods by which the globally unique Material and locally unique Instance numbers are created.

A 1-byte length value to define the length of the remaining part of the UMID.

A 3-byte Instance number which is used to distinguish between different 'instances' of material with the same Material number.

A 16-byte Material number which is used to identify each clip. Each Material number is the same for related instances of the same material.

The second set of 32 bytes of the signature metadata as a set of packed metadata items used to create an extended UMID. The extended UMID comprises the basic UMID followed immediately by signature metadata which comprises:

An 8-byte time/date code identifying the time and date of the Content Unit creation.

A 12-byte value which defines the spatial co-ordinates at the time of Content Unit creation.

3 groups of 4-byte codes which register the country, organisation and user codes Each component of the basic and extended UMIDs will now be defined in turn.

The 12-byte Universal Label

The first 12 bytes of the UMID provide identification of the UMID by the registered string value defined in table 1.

TABLE 1

Specification of the UMID Universal Label

| Byte No. | Description | Value (hex) |
| --- | --- | --- |
| 1 | Object Identifier | 06 h |
| 2 | Label size | 0 Ch |
| 3 | Designation: ISO | 2 Bh |
| 4 | Designation: SMPTE | 34 h |
| 5 | Registry: Dictionaries | 01 h |
| 6 | Registry: Metadata Dictionaries | 01 h |
| 7 | Standard: Dictionary Number | 01 h |
| 8 | Version number | 01 h |
| 9 | Class: Identification and location | 01 h |
| 10 | Sub-class: Globally Unique Identifiers | 01 h |
| 11 | Type: UMID (Picture, Audio, Data, Group) | 01, 02, 03, 04 h |
| 12 | Type: Number creation method | XX h |

The hex values in table 1 may be changed: the values given are examples. Also the bytes 1–12 may have designations other than those shown by way of example in the table. Referring to the Table 1, in the example shown byte 4 indicates that bytes 5–12 relate to a data format agreed by SMPTE. Byte 5 indicates that bytes 6 to 10 relate to "dictionary" data. Byte 6 indicates that such data is "metadata" defined by bytes 7 to 10. Byte 7 indicates the part of the dictionary containing metadata defined by bytes 9 and 10. Byte 10 indicates the version of the dictionary. Byte 9 indicates the class of data and Byte 10 indicates a particular item in the class.

In the present embodiment bytes 1 to 10 have fixed pre-assigned values. Byte 11 is variable. Thus referring to FIG. 7, and to Table 1 above, it will be noted that the bytes 1 to 10 of the label of the UMID are fixed. Therefore they may be replaced by a 1 byte 'Type' code T representing the bytes 1 to 10. The type code T is followed by a length code L. That is followed by 2 bytes, one of which is byte 11 of Table 1 and the other of which is byte 12 of Table 1, an instance number (3 bytes) and a material number (16 bytes). Optionally the material number may be followed by the signature metadata of the extended UMID and/or other metadata.

The UMID type (byte 11) has 4 separate values to identify each of 4 different data types as follows:

'01h'=UMID for Picture material
'02h'=UMID for Audio material
'03h'=UMID for Data material
'04h'=UMID for Group material (i.e. a combination of related essence).

The last (12th) byte of the 12 byte label identifies the methods by which the material and instance numbers are created. This byte is divided into top and bottom nibbles where the top nibble defines the method of Material number creation and the bottom nibble defines the method of Instance number creation.

Length

The Length is a 1-byte number with the value '13h' for basic UMIDs and '33h' for extended UMIDs.

Instance Number

The Instance number is a unique 3-byte number which is created by one of several means defined by the standard. It provides the link between a particular 'instance' of a clip and externally associated metadata. Without this instance number, all material could be linked to any instance of the material and its associated metadata.

The creation of a new clip requires the creation of a new Material number together with a zero Instance number.

Therefore, a non-zero Instance number indicates that the associated clip is not the source material. An Instance number is primarily used to identify associated metadata related to any particular instance of a clip.

Material Number

The 16-byte Material number is a non-zero number created by one of several means identified in the standard. The number is dependent on a 6-byte registered port ID number, time and a random number generator.

Signature Metadata

Any component from the signature metadata may be null-filled where no meaningful value can be entered. Any null-filled component is wholly null-filled to clearly indicate a downstream decoder that the component is not valid.

The Time-Date Format

The date-time format is 8 bytes where the first 4 bytes are a UTC (Universal Time Code) based time component. The time is defined either by an AES3 32-bit audio sample clock or SMPTE 12M depending on the essence type.

The second 4 bytes define the date based on the Modified Julian Data (MJD) as defined in SMPTE 309M. This counts up to 999,999 days after midnight on the Nov. 17, 1858 and allows dates to the year 4597.

The Spatial Co-Ordinate Format

The spatial co-ordinate value consists of three components defined as follows:

Altitude: 8 decimal numbers specifying up to 99,999,999 metres.
Longitude: 8 decimal numbers specifying East/West 180.00000 degrees (5 decimal places active).
Latitude: 8 decimal numbers specifying North/South 90.00000 degrees (5 decimal places active).

The Altitude value is expressed as a value in metres from the centre of the earth thus allowing altitudes below the sea level.

It should be noted that although spatial co-ordinates are static for most clips, this is not true for all cases. Material captured from a moving source such as a camera mounted on a vehicle may show changing spatial co-ordinate values.

Country Code

The Country code is an abbreviated 4-byte alpha-numeric string according to the set defined in ISO 3166. Countries which are not registered can obtain a registered alpha-numeric string from the SMPTE Registration Authority.

Organisation Code

The Organisation code is an abbreviated 4-byte alpha-numeric string registered with SMPTE. Organisation codes have meaning only in relation to their registered Country code so that Organisation codes can have the same value in different countries.

User Code

The User code is a 4-byte alpha-numeric string assigned locally by each organisation and is not globally registered. User codes are defined in relation to their registered Organisation and Country codes so that User codes may have the same value in different organisations and countries.

Freelance Operators

Freelance operators may use their country of domicile for the country code and use the Organisation and User codes concatenated to e.g. an 8 byte code which can be registered with SMPTE. These freelance codes may start with the '~' symbol (ISO 8859 character number 7Eh) and followed by a registered 7 digit alphanumeric string.

As will be appreciated by those skilled in the art various modifications may be made to the embodiments herein before described without departing from the scope of the present invention. For example whilst embodiments have been described with a data base, it will be appreciated that the database could be arranged as any convenient data store.

Having regard to the above description of embodiments of the invention, it will be understood that an aspect of the present invention provides a method of facilitating identification of audio and/or video productions, comprising the steps of maintaining a register of unique program identification codes which identify corresponding audio/video productions, assigning a new unique program identification code on request from a producer of a new audio/video production, and up-dating the register with the new unique program identification code in association with the new audio/video production.

A further aspect of the invention provides an asset management system for facilitating identification of audio and/or video productions, the asset management system comprising a database for storing data representative of a register of unique program identification codes which identify corresponding audio/video productions, an asset management processor coupled to the database which is arranged in operation to assign a new unique program identification code on request from a producer of a new audio/video production, and to up-date the register with said new unique program identification code in association with said new audio/video production.

The invention claimed is:

1. A method of facilitating identification of audio and/or video productions, said method comprising
   maintaining a register of unique program identification codes which identify corresponding audio/video productions,
   assigning a new unique program identification code on request from a producer of a new audio/video production,
   up-dating the register with said new unique program identification code in association with said new audio/video production,
   acquiring items of audio/video material for use in forming said new audio/video production,
   identifying the copyright owner of said new audio/video production,
   storing an identifier of the copyright owner of said new audio/video production in said register in association with said unique program identification code,
   generating during acquisition of said audio/video material items a unique identifying code for each of said audio/video material items,
   populating said register with said unique identifying codes in association with said unique program identification code,
   identifying the copyright owner of each of said items of audio/video material used to form said new audio/video production, and
   populating said register with an identifier of said copyright owner of each of said audio/video material items in association with the corresponding one of said unique identifying codes.

2. A method as claimed in claim 1, comprising
   editing said audio/video material items by selectively combining said items of said audio/video material to form said new audio/video production, and
   up-dating said unique identifying codes in association with said unique program identification code corresponding to said selective combination.

3. A method as claimed in claim 1, comprising the steps of selling the new unique program identification code to the producer.

4. An asset management system for facilitating identification of audio and/or video productions, said asset management system comprising
   a database for storing data representative of a register of unique program identification codes which identify corresponding audio/video productions,
   an asset management processor coupled to said database which is arranged in operation to assign a new unique program identification code on request from a producer of a new audio/video production, and to up-date the register with said new unique program identification code in association with said new audio/video production, and
   an audio/video generation apparatus for acquiring items of audio/video material for use in forming said new audio/video production, said audio/video generation apparatus being arranged in operation to generate a unique identifying code for each of said audio/video material items, wherein said asset management processor is arranged in operation to receive said unique identification codes and to store said codes in said database in association with said unique program identification code wherein said asset management processor is arranged in operation,
   to receive rights data representative of ownership rights of said new audio/video production and/or said audio/video material items, and
   to store said rights data in association with the corresponding unique program identification code and/or said unique identifying code in said database, the rights data identifying a copyright owner of the new audio/video production and copyright owner of each of the audio/video material items used in the new audio/video production.

5. An asset management system as claimed in claim 4, wherein said asset management processor is arranged in operation,
   to receive royalty data representative of an agreed royalty for use of said audio/video productions and/or said new audio/video material items, and
   to store said royalty data in said database, and consequent upon a request for use of at least one of said new audio/video productions and/or said audio/video material items, said asset management processor is arranged in operation to calculate the cost of using said productions and/or material items.

6. An asset management system as claimed in claim 4, wherein said asset management processor is arranged in operation,
   to receive analysis data representative of a respective proportion of consumers which have consumed said new audio/video productions and/or said audio/video material items, and
   to store said analysis data in association with the corresponding unique program identification code and/or said unique identifying code in said data base.

7. An asset management system as claimed in claim 6, wherein said asset management processor is arranged in operation to calculate said royalty payments in dependence upon said royalty data in combination with said analysis data.

8. An asset management system as claimed in claim 4, wherein said unique program identification code is a UPID.

9. An asset management system as claimed in claim 4, wherein said unique identifying code is a UMID.

10. A method of facilitating identification of audio and/or video productions as claimed in claim 1, wherein said unique program identification code is a UPID.

11. A method of facilitating identification as claimed in claim 1, wherein said unique identifying code is a UMID.

12. A computer program product with a readable medium, having recorded thereon computer executable instructions, which when loaded on to a data processor causes the processor to operate in accordance with a method including, maintaining a register of unique program identification codes which identify corresponding audio/video productions, assigning a new unique program identification code on request from a producer of a new audio/video production, up-dating the register with said new unique program identification code in association with said new audio/video production, acquiring items of audio/video material for use in forming said new audio/video production, identifying the copyright owner of said new audio/video production, storing an identifier of the copyright owner of said new audio/video production in said register in association with said unique program identification code, generating during acquisition of said audio/video material items a unique identifying code for each of said audio/video material items, populating said register with said unique identifying codes in association with said unique program identification code, identifying the copyright owner of each of said items of audio/video material used to form said new audio/video production, and populating said register with an identifier of said copyright owner of each of said audio/video material items in association with the corresponding one of said unique identifying codes.

\* \* \* \* \*